ically all the ammonia into ammonium sul-
UNITED STATES PATENT OFFICE.

GERHARD NICOLAAS VIS, OF PARIS, FRANCE.

PROCESS OF PREPARING PURE AMMONIA FROM AMMONIA CONTAINING GASES.

1,366,303.   Specification of Letters Patent.   Patented Jan. 18, 1921.

No Drawing. Original application filed October 25, 1918, Serial No. 259,681. Divided and this application filed December 3, 1919. Serial No. 342,247.

*To all whom it may concern:*

Be it known that I, GERHARD NICOLAAS VIS, a subject of the Queen of the Netherlands, and a resident of Paris, France, have invented new and useful Improvements in Processes of Preparing Pure Ammonia from Ammonia Containing Gases, which invention is fully set forth in the following specification.

It is known that the ammonia contained in gases from coke ovens or from gas works and other gases, is in a state of extreme dilution and that the fixing of the ammonia present whether in the form of free ammonia, of carbonate, or hydrosulfid or other form, takes place easily either by absorption in sulfuric acid which transforms practically all the ammonia into ammonium sulfate, or by absorption in water with the production of crude ammoniacal liquors which are subsequently transformed into ammonium sulfate by the aid of lime and sulfuric acid.

This invention has for its primary objects to replace the sulfuric acid with an agent of less commercial value and to resolve the resulting product into constituents of wider usefulness in the arts.

According to this invention sodium bisulfate is employed for this purpose.

The sodium bisulfate is employed either in the solid state in the presence of a quantity of water insufficient to dissolve it completely or in a more or less concentrated solution.

The absorption of the ammonia takes place as if sulfuric acid were employed, but the resulting product consists of ammonium sulfate and sodium sulfate in about equimolecular proportion according to the composition of the sodium bisulfate employed. These two products form a double salt:

$$(NH_4)_2SO_4.Na_2SO_4.4H_2O$$

which crystallizes very easily and which is of no commercial value.

According to this invention the above salt is transformed into sodium bisulfate, water and concentrated gaseous ammonia which may be compressed or may be dissolved in water and transformed by known means into commercial and industrial products.

In order to resolve sodium sulfate and ammonium sulfate starting from their equimolecular or nearly equi-molecular mixture into sodium acid sulfate and free ammonia, I take advantage of the fact of the non-existence of the double salt at a high temperature in the presence of water.

By way of example illustrating one method of carrying out the process:

500 kgs. of coarsely crushed sodium bisulfate are placed in contact with about 280 kgs. of water. The gases to be treated are passed through the mixture which is heated to about 70° C. All the ammonia contained in the gases is absorbed by the sodium bisulfate which is transformed into the double salt $$Na_2SO_4.(NH_4)_2SO_4.4H_2O.$$

The double salt thus produced is then heated to temperatures between 350° and 600° C. on a bath in a closed receiver provided with a blow-off pipe.

Thus by heating to 450° C. the greater part of the ammonia, for example 60%, is evolved in the form of gas together with an equimolecular quantity of water and traces of ammonium sulfate while the corresponding portion of the double salt is transformed into sodium bisulfate; the receiver will therefore contain sodium bisulfate more or less mixed with ammonium sulfate and neutral sodium sulfate according to the extent to which the reaction is pushed. The resulting sodium bisulfate or the said mixture again serves to absorb ammonia from the diluted gases to be treated.

The subject matter herein claimed is disclosed in my earlier application Serial No. 259,681, filed Oct. 25, 1918, of which the present application is a division.

What I claim is:

A process for transforming free or combined ammonia mixed with inert gas or steam into concentrated ammonia, which consists in absorbing the ammonia by the aid of sodium bisulfate to obtain a double salt of sodium sulfate and ammonium sulfate and heating the said salt to between 350° and 600° to obtain ammonia gas and bisulfate of sodium and returning the latter to the cycle of operations.

In testimony whereof I have signed this specification.

GERHARD NICOLAAS VIS.

Witnesses:
  HENRY T. WILCOX,
  ANDRÉ PLAU.